United States Patent
Ni et al.

(10) Patent No.: US 11,382,074 B2
(45) Date of Patent: Jul. 5, 2022

(54) CONTROL INFORMATION TRANSMISSION METHOD, CONTROL INFORMATION DETECTION METHOD, NETWORK DEVICE AND USER EQUIPMENT

(71) Applicants: China Mobile Communication Co., Ltd Research Institute, Beijing (CN); China Mobile Communications Group Co., Ltd., Beijing (CN)

(72) Inventors: Jiqing Ni, Beijing (CN); Wei Zhou, Beijing (CN); Jun Zuo, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 17 days.

(21) Appl. No.: 16/757,088

(22) PCT Filed: Oct. 16, 2018

(86) PCT No.: PCT/CN2018/110454
§ 371 (c)(1),
(2) Date: Apr. 17, 2020

(87) PCT Pub. No.: WO2019/076303
PCT Pub. Date: Apr. 25, 2019

(65) Prior Publication Data
US 2020/0245313 A1    Jul. 30, 2020

(30) Foreign Application Priority Data

Oct. 19, 2017   (CN) .......................... 201710975853.0

(51) Int. Cl.
*H04W 72/04*     (2009.01)
*H04L 27/26*     (2006.01)
*H04W 72/00*     (2009.01)

(52) U.S. Cl.
CPC ..... *H04W 72/0406* (2013.01); *H04L 27/2602* (2013.01); *H04W 72/005* (2013.01)

(58) Field of Classification Search
CPC ......... H04W 72/0406; H04W 74/0816; H04W 74/008; H04W 72/0446; H04W 24/10;
(Continued)

(56) References Cited

U.S. PATENT DOCUMENTS

| | | |
|---|---|---|
| 2011/0274031 A1 | 11/2011 | Gaal |
| 2013/0201975 A1 | 8/2013 | Chen et al. |

(Continued)

FOREIGN PATENT DOCUMENTS

| | | |
|---|---|---|
| CN | 105340198 A | 2/2016 |
| CN | 1065850165 A | 6/2017 |
| EP | 2854455 A1 | 4/2015 |

OTHER PUBLICATIONS

Chinese Office Action for Chinese Application No. 201710975853.0, dated Apr. 27, 2020, 13 pages.
(Continued)

*Primary Examiner* — Phuoc H Doan
(74) *Attorney, Agent, or Firm* — Price Heneveld LLP (57) ABSTRACT

The present disclosure provides a control information transmission method, a control information detection method, a network device and a UE. The control information transmission method includes: mapping a control resource set for transmitting control information to at least one RB adjacent to an RB occupied by an SS block in accordance with a predetermined mapping mode; and transmitting the predetermined mapping mode to a UE, and transmitting the control information to the UE on the at least one RB occupied by the control resource set.

20 Claims, 4 Drawing Sheets

---

31 — mapping a control resource set for transmitting control information to at least one RB adjacent to an RB occupied by an SS block in accordance with a predetermined mapping mode 32 — transmitting the predetermined mapping mode to the UE, and transmitting the control information to the UE on the at least one RB occupied by the control resource set (58) Field of Classification Search
CPC . H04W 56/001; H04W 24/08; H04W 74/002; H04B 7/086; H04L 25/0226; H04L 5/10; H04L 5/0051
USPC .................................................. 370/329, 327
See application file for complete search history.

(56) References Cited

U.S. PATENT DOCUMENTS

2015/0139093 A1    5/2015    Seo
2016/0112172 A1    4/2016    Seo et al.
2018/0034599 A1    2/2018    Zhou
2020/0213051 A1*    7/2020    Wu ..................... H04W 72/005

OTHER PUBLICATIONS

"Discussion on Remaining Minimum System Information," 3GPP TSG RAN WG1 Meeting #90bis, Oct. 9-13, 2017, R1-1717461, Prague, Czech Republic, 18 pages.

* cited by examiner

CONTROL INFORMATION TRANSMISSION METHOD, CONTROL INFORMATION DETECTION METHOD, NETWORK DEVICE AND USER EQUIPMENT

CROSS-REFERENCE TO RELATED APPLICATION

The present application is the U.S. national phase of PCT Application No. PCT/CN2018/110454 filed on Oct. 16, 2018, which claims a priority of the Chinese patent application 201710975853.0 filed on Oct. 19, 2017, which are incorporated herein by reference in their entirety.

TECHNICAL FIELD

The present disclosure relates to the field of communication technology, in particular to a control information transmission method, a control information detection method, a network device and a User Equipment (UE).

BACKGROUND

Figure 1:
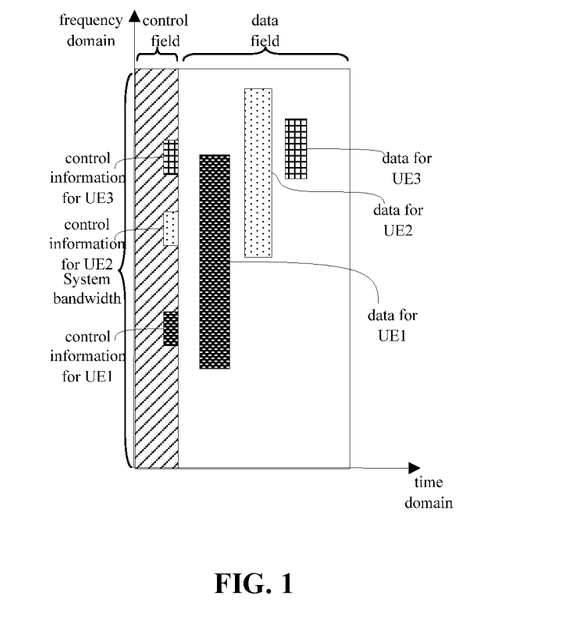
FIG. 1 is a schematic view showing a full bandwidth configuration of a control channel in the related art.

In a conventional mobile communication system, a control channel needs to occupy the entire system bandwidth, as shown in FIG. 1. When detecting the control channel to acquire control information, a UE needs to detect the entire system bandwidth, mainly resulting in the following problems. 1) Because the UE needs to detect the entire system bandwidth, the detection complexity of the control information may increase dramatically when the system bandwidth is relatively large. 2) The UE needs to be provided with a large bandwidth for the reception of the control information, so it is adverse to the flexible configuration of the bandwidth for the UE and the access of a small-bandwidth UE.

Figure 2:
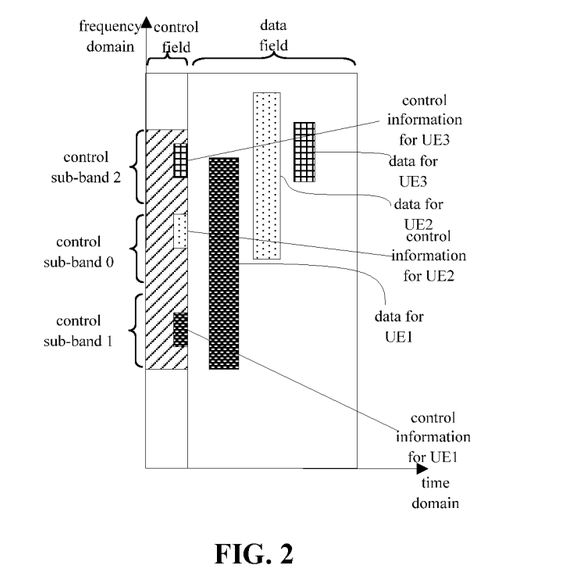
FIG. 2 is a schematic view showing a sub-band configuration of the control channel in the related art.

In order to solve the above problems, in the standardization process, one method is to divide a bandwidth available for the control channel within N available Orthogonal Frequency Division Multiplexing (OFDM) systems into M control sub-bands or control resource sets. In this way, the UE merely needs to detect the control information in one control resource set, so as to reduce the detection complexity of the UE, as shown in FIG. 2.

In a known scheme, the control resource sets are usually mapped to first one, two or three symbols within one slot.

In a $5^{th}$-Generation (5G) system, a multi-beam design is adopted so as to improve the coverage performance. Within one synchronization period, a plurality of Synchronization Signal (SS) blocks, i.e., Physical Broadcast Channel (PBCH) blocks, is used for the synchronization of UEs. Each SS block corresponds to one beam. Here, the control resource set for the transmission of some public system information (similar to System Information Blocks (SIBs) in a Long Term Evolution (LTE) system) is defined as a public control resource set. The optimal design of the public control resource set needs to be provided, so as to improve the transmission reliability of the system information.

In a conventional transmission method, the public control resource set is placed in first several symbols within one slot and multiplexed with the SS blocks in a time-division manner.

In this method, in a multi-beam system scenario, a beam scanning operation needs to be performed on each public control resource set. A beam direction is fixed, so it is merely able to schedule the UEs within a beam range. When there is a relatively large quantity of beams, the scheduling flexibility of the system may be significantly reduced.

SUMMARY

An object of the present disclosure is to provide a control information transmission method, a control information detection method, a network device and a UE, so as to map a control resource set to same time-domain resources as a plurality of symbols occupied by SS blocks, thereby to reduce the quantity of time-frequency resources occupied during a beam scanning operation, improve the scheduling flexibility of the UE, and reduce the detection complexity of the UE.

In one aspect, the present disclosure provides in some embodiments a control information transmission method, including: mapping a control resource set for transmitting control information to at least one Resource Block (RB) adjacent to an RB occupied by an SS block in accordance with a predetermined mapping mode; and transmitting the predetermined mapping mode to a UE, and transmitting the control information to the UE on the at least one RB occupied by the control resource set.

In some possible embodiments of the present disclosure, the mapping the control resource set for transmitting the control information to at least one RB adjacent to the RB occupied by the SS block in accordance with the predetermined mapping mode includes mapping the control resource set for transmitting the control information to at least one RB adjacent to an RB occupied by a Primary Synchronization Signal (PSS) in the SS block and to at least one RB adjacent to an RB occupied by a PBCH in the SS block in accordance with the predetermined mapping mode.

In some possible embodiments of the present disclosure, the at least one RB adjacent to the RB occupied by the PSS includes at least one RB at a same time domain as, and at a different frequency domain from, the RB occupied by the PSS, and the at least one RB adjacent to the RB occupied by the PBCH includes at least one RB at a same time domain as, and at a different frequency domain from, the RB occupied by the PBCH.

In some possible embodiments of the present disclosure, the at least one RB at the same time domain as, and at the different frequency domain from, the RB occupied by the PSS includes a first Control Channel Element (CCE) consisting of N consecutive RBs at the same time domain as the RB occupied by the PSS and at a first frequency domain, and a second CCE consisting of N consecutive RBs at the same time domain as the RB occupied by the PSS and at a second frequency domain. The at least one RB at the same time domain as, and at the different frequency domain from, the RB occupied by the PBCH includes a third CCE consisting of N consecutive RBs at the same time domain as the RB occupied by the PBCH and at a third frequency domain, and a fourth CCE consisting of N consecutive RBs at the same time domain as the RB occupied by the PBCH and at a fourth frequency domain.

In some possible embodiments of the present disclosure, the PSS and the PBCH are located at a same central frequency point and at different time domains, and occupy different bandwidths. The PSS occupies one OFDM symbol in the time domain, and the PBCH occupies three OFDM symbols in the time domain. A frequency in the first frequency domain is greater than a frequency in the frequency domain where the PSS is located, and the frequency in the frequency domain where the PSS is located is greater than a frequency in the second frequency domain. A frequency in the third frequency domain is greater than a frequency in the frequency domain where the PBCH is located, and the frequency in the frequency domain where the PBCH is located is greater than a frequency in the fourth frequency domain.

In some possible embodiments of the present disclosure, N=6.

In some possible embodiments of the present disclosure, the control resource set includes the first CCE, the second CCE, the third CCE, and the fourth CCE. The transmitting the control information on the at least one RB occupied by the control resource set includes transmitting the control information on the RBs occupied by the first CCE, the second CCE, the third CCE and the fourth CCE in the control resource set.

In some possible embodiments of the present disclosure, the control information transmission method further includes mapping the control resource set for transmitting the control information to, in accordance with the predetermined mapping mode, number M1 of adjacent RBs at a same time domain as the first CCE, number M2 of adjacent RBs at a same time domain as the second CCE, number M3 of adjacent RBs at a same time domain as a first OFDM symbol of the third CCE, number M4 of adjacent RBs at a same time domain as a first OFDM symbol of the fourth CCE, number M5 of adjacent RBs at a same time domain as a second OFDM symbol of the third CCE, number M6 of adjacent RBs at a same time domain as a second OFDM symbol of the fourth CCE, number M7 of adjacent RBs at a same time domain as a third OFDM symbol of the third CCE, and number M8 of adjacent RBs at a same time domain as a third OFDM symbol of the fourth CCE. The M1, M3, M5 and M7 RBs are located at a same fifth frequency domain, the numbers of M2, M4, M6 and M8 of RBs are located at a same sixth frequency domain, a frequency in the fifth frequency domain is greater than the frequency in each of the first frequency domain and the third frequency domain, and a frequency in the sixth frequency domain is smaller than the frequency in each of the second frequency domain and the fourth frequency domain.

In some possible embodiments of the present disclosure, the number of M1 and M3 of RBs form a fifth CCE, the number of M2 and M4 of RBs form a sixth CCE, the number of M5 and M7 of RBs form a seventh CCE, and the number of M6 and M8 of RBs form an eighth CCE.

In some possible embodiments of the present disclosure, M1=M2=M3=M4=M5=M6=M7=M8=3.

In some possible embodiments of the present disclosure, the control resource set includes the first CCE, the second CCE, the third CCE, the fourth CCE, the fifth CCE, the sixth CCE, the seventh CCE and the eighth CCE. The transmitting the control information on the at least one RB occupied by the control resource set includes: transmitting the control information on the RBs occupied by the first CCE, the second CCE, the third CCE and the fourth CCE in the control resource set; and/or transmitting the control information on the RBs occupied by the first CCE, the second CCE, the third CCE, the fourth CCE, the fifth CCE, the sixth CCE, the seventh CCE and the eighth CCE in the control resource set.

In some possible embodiments of the present disclosure, the control information transmission method further includes transmitting a multiplexing mode of the control resource set and the SS block to the UE, and the multiplexing mode includes time-division multiplexing or frequency-division multiplexing.

In some possible embodiments of the present disclosure, the transmitting the multiplexing mode of the control resource set and the SS block to the UE includes transmitting the multiplexing mode of the control resource set and the SS block to the UE through semi-static indication.

In another aspect, the present disclosure provides in some embodiments a control information detection method, including: receiving a predetermined mapping mode from a network device, the predetermined mapping mode being a mapping mode in which a control resource set for transmitting control information is mapped by the network device to at least one RB adjacent to an RB occupied by an SS block; and detecting the control information on the at least one RB occupied by the control resource set in accordance with the predetermined mapping mode.

In some possible embodiments of the present disclosure, the at least one RB adjacent to the RB occupied by the SS block includes at least one RB adjacent to an RB occupied by a PSS in the SS block and at least one RB adjacent to an RB occupied by a PBCH in the SS block.

In some possible embodiments of the present disclosure, the at least one RB adjacent to the RB occupied by the PSS includes at least one RB at a same time domain as, and at a different frequency domain from, the RB occupied by the PSS, and the at least one RB adjacent to the RB occupied by the PBCH includes at least one RB at a same time domain as, and at a different frequency domain from, the RB occupied by the PBCH.

In some possible embodiments of the present disclosure, the at least one RB at the same time domain as, and at the different frequency domain from, the RB occupied by the PSS includes a first Control Channel Element (CCE) consisting of N consecutive RBs at the same time domain as the RB occupied by the PSS and at a first frequency domain, and a second CCE consisting of N consecutive RBs at the same time domain as the RB occupied by the PSS and at a second frequency domain. The at least one RB at the same time domain as, and at the different frequency domain from, the RB occupied by the PBCH includes a third CCE consisting of N consecutive RBs at the same time domain as the RB occupied by the PBCH and at a third frequency domain, and a fourth CCE consisting of N consecutive RBs at the same time domain as the RB occupied by the PBCH and at a fourth frequency domain.

In some possible embodiments of the present disclosure, the PSS and the PBCH are located at a same central frequency point and at different time domains, and occupy different bandwidths. The PSS occupies one OFDM symbol in the time domain, and the PBCH occupies three OFDM symbols in the time domain. A frequency in the first frequency domain is greater than a frequency in the frequency domain where the PSS is located, and the frequency in the frequency domain where the PSS is located is greater than a frequency in the second frequency domain. A frequency in the third frequency domain is greater than a frequency in the frequency domain where the PBCH is located, and the frequency in the frequency domain where the PBCH is located is greater than a frequency in the fourth frequency domain.

In some possible embodiments of the present disclosure, N=6.

In some possible embodiments of the present disclosure, the control resource set includes the first CCE, the second CCE, the third CCE, and the fourth CCE. The detecting the control information on the at least one RB occupied by the control resource set in accordance with the predetermined mapping mode includes detecting the control information transmitted through the RBs occupied by the first CCE, the second CCE, the third CCE and the fourth CCE in the control resource set in accordance with the predetermined mapping mode.

In some possible embodiments of the present disclosure, the at least one RB adjacent to the RB occupied by the SS block further includes: number M1 of adjacent RBs at a same time domain as the first CCE, number M2 of adjacent RBs at a same time domain as the second CCE, number M3 of adjacent RBs at a same time domain as a first OFDM symbol of the third CCE, number M4 of adjacent RBs at a same time domain as a first OFDM symbol of the fourth CCE, number M5 of adjacent RBs at a same time domain as a second OFDM symbol of the third CCE, number M6 of adjacent RBs at a same time domain as a second OFDM symbol of the fourth CCE, number M7 of adjacent RBs at a same time domain as a third OFDM symbol of the third CCE, and number M8 of adjacent RBs at a same time domain as a third OFDM symbol of the fourth CCE. The M1, M3, M5 and M7 RBs are located at a same fifth frequency domain, the numbers of M2, M4, M6 and M8 of RBs are located at a same sixth frequency domain, a frequency in the fifth frequency domain is greater than the frequency in each of the first frequency domain and the third frequency domain, and a frequency in the sixth frequency domain is smaller than the frequency in each of the second frequency domain and the fourth frequency domain.

In some possible embodiments of the present disclosure, the number of M1 and M3 of RBs form a fifth CCE, the number of M2 and M4 of RBs form a sixth CCE, the number of M5 and M7 of RBs form a seventh CCE, and the number of M6 and M8 of RBs form an eighth CCE.

In some possible embodiments of the present disclosure, M1=M2=M3=M4=M5=M6=M7=M8=3.

In some possible embodiments of the present disclosure, the control resource set includes the first CCE, the second CCE, the third CCE, the fourth CCE, the fifth CCE, the sixth CCE, the seventh CCE and the eighth CCE. The detecting the control information on the at least one RB occupied by the control resource set in accordance with the predetermined mapping mode includes: detecting the control information transmitted through the RBs occupied by the first CCE, the second CCE, the third CCE and the fourth CCE in the control resource set in accordance with the predetermined mapping mode; and/or detecting the control information transmitted through the RBs occupied by the first CCE, the second CCE, the third CCE, the fourth CCE, the fifth CCE, the sixth CCE, the seventh CCE and the eighth CCE in the control resource set in accordance with the predetermined mapping mode.

In some possible embodiments of the present disclosure, the control information detection method further includes receiving a multiplexing mode of the control resource set and the SS block from the network device, and the multiplexing mode includes time-division multiplexing or frequency-division multiplexing.

In some possible embodiments of the present disclosure, the receiving the multiplexing mode of the control resource set and the SS block from the network device includes receiving the multiplexing mode of the control resource set and the SS block from the network device through semi-static indication.

In yet another aspect, the present disclosure provides in some embodiments a network device, including: a processor configured to map a control resource set for transmitting control information to at least one RB adjacent to an RB occupied by an SS block in accordance with a predetermined mapping mode; and a transceiver configured to transmit the predetermined mapping mode to the UE, and transmit the control information to the UE on the at least one RB occupied by the control resource set.

In some possible embodiments of the present disclosure, the processor is further configured to map the control resource set for transmitting the control information to at least one RB adjacent to an RB occupied by a PSS in the SS block and to at least one RB adjacent to an RB occupied by a PBCH in the SS block in accordance with the predetermined mapping mode.

In some possible embodiments of the present disclosure, the at least one RB adjacent to the RB occupied by the PSS includes at least one RB at a same time domain as, and at a different frequency domain from, the RB occupied by the PSS, and the at least one RB adjacent to the RB occupied by the PBCH includes at least one RB at a same time domain as, and at a different frequency domain from, the RB occupied by the PBCH.

In some possible embodiments of the present disclosure, the at least one RB at the same time domain as, and at the different frequency domain from, the RB occupied by the PSS includes a first CCE consisting of N consecutive RBs at the same time domain as the RB occupied by the PSS and at a first frequency domain, and a second CCE consisting of N consecutive RBs at the same time domain as the RB occupied by the PSS and at a second frequency domain. The at least one RB at the same time domain as, and at the different frequency domain from, the RB occupied by the PBCH includes a third CCE consisting of N consecutive RBs at the same time domain as the RB occupied by the PBCH and at a third frequency domain, and a fourth CCE consisting of N consecutive RBs at the same time domain as the RB occupied by the PBCH and at a fourth frequency domain.

In some possible embodiments of the present disclosure, the PSS and the PBCH are located at a same central frequency point and at different time domains, and occupy different bandwidths. The PSS occupies one OFDM symbol in the time domain, and the PBCH occupies three OFDM symbols in the time domain. A frequency in the first frequency domain is greater than a frequency in the frequency domain where the PSS is located, and the frequency in the frequency domain where the PSS is located is greater than a frequency in the second frequency domain. A frequency in the third frequency domain is greater than a frequency in the frequency domain where the PBCH is located, and the frequency in the frequency domain where the PBCH is located is greater than a frequency in the fourth frequency domain.

In some possible embodiments of the present disclosure, the control resource set includes the first CCE, the second CCE, the third CCE, and the fourth CCE. The transceiver is further configured to transmit the control information on the RBs occupied by the first CCE, the second CCE, the third CCE and the fourth CCE in the control resource set.

In some possible embodiments of the present disclosure, the processor is further configured to map the control resource set for transmitting the control information to, in accordance with the predetermined mapping mode, number M1 of adjacent RBs at a same time domain as the first CCE, number M2 of adjacent RBs at a same time domain as the second CCE, number M3 of adjacent RBs at a same time domain as a first OFDM symbol of the third CCE, number M4 of adjacent RBs at a same time domain as a first OFDM symbol of the fourth CCE, number M5 of adjacent RBs at a same time domain as a second OFDM symbol of the third CCE, number M6 of adjacent RBs at a same time domain as a second OFDM symbol of the fourth CCE, number M7 of adjacent RBs at a same time domain as a third OFDM symbol of the third CCE, and number M8 of adjacent RBs at a same time domain as a third OFDM symbol of the fourth CCE. The M1, M3, M5 and M7 RBs are located at a same fifth frequency domain, the numbers of M2, M4, M6 and M8 of RBs are located at a same sixth frequency domain, a frequency in the fifth frequency domain is greater than the frequency in each of the first frequency domain and the third frequency domain, and a frequency in the sixth frequency domain is smaller than the frequency in each of the second frequency domain and the fourth frequency domain.

In some possible embodiments of the present disclosure, the number of M1 and M3 of RBs form a fifth CCE, the number of M2 and M4 of RBs form a sixth CCE, the number of M5 and M7 of RBs form a seventh CCE, and the number of M6 and M8 of RBs form an eighth CCE.

In some possible embodiments of the present disclosure, the control resource set includes the first CCE, the second CCE, the third CCE, the fourth CCE, the fifth CCE, the sixth CCE, the seventh CCE and the eighth CCE. The transceiver is further configured to: transmit the control information on the RBs occupied by the first CCE, the second CCE, the third CCE and the fourth CCE in the control resource set; and/or transmit the control information on the RBs occupied by the first CCE, the second CCE, the third CCE, the fourth CCE, the fifth CCE, the sixth CCE, the seventh CCE and the eighth CCE in the control resource set.

In some possible embodiments of the present disclosure, the transceiver is further configured to transmit a multiplexing mode of the control resource set and the SS block to the UE, and the multiplexing mode includes time-division multiplexing or frequency-division multiplexing.

In still yet another aspect, the present disclosure provides in some embodiments a UE, including a transceiver configured to: receive a predetermined mapping mode from a network device, the predetermined mapping mode being a mapping mode in which a control resource set for transmitting control information is mapped by the network device to at least one RB adjacent to an RB occupied by an SS block; and detect the control information on the at least one RB occupied by the control resource set in accordance with the predetermined mapping mode.

In some possible embodiments of the present disclosure, the at least one RB adjacent to the RB occupied by the SS block includes at least one RB adjacent to an RB occupied by a PSS in the SS block and at least one RB adjacent to an RB occupied by a PBCH in the SS block.

In some possible embodiments of the present disclosure, the at least one RB adjacent to the RB occupied by the PSS includes at least one RB at a same time domain as, and at a different frequency domain from, the RB occupied by the PSS, and the at least one RB adjacent to the RB occupied by the PBCH includes at least one RB at a same time domain as, and at a different frequency domain from, the RB occupied by the PBCH.

In some possible embodiments of the present disclosure, the at least one RB at the same time domain as, and at the different frequency domain from, the RB occupied by the PSS includes a first Control Channel Element (CCE) consisting of N consecutive RBs at the same time domain as the RB occupied by the PSS and at a first frequency domain, and a second CCE consisting of N consecutive RBs at the same time domain as the RB occupied by the PSS and at a second frequency domain. The at least one RB at the same time domain as, and at the different frequency domain from, the RB occupied by the PBCH includes a third CCE consisting of N consecutive RBs at the same time domain as the RB occupied by the PBCH and at a third frequency domain, and a fourth CCE consisting of N consecutive RBs at the same time domain as the RB occupied by the PBCH and at a fourth frequency domain.

In some possible embodiments of the present disclosure, the PSS and the PBCH are located at a same central frequency point and at different time domains, and occupy different bandwidths. The PSS occupies one OFDM symbol in the time domain, and the PBCH occupies three OFDM symbols in the time domain. A frequency in the first frequency domain is greater than a frequency in the frequency domain where the PSS is located, and the frequency in the frequency domain where the PSS is located is greater than a frequency in the second frequency domain. A frequency in the third frequency domain is greater than a frequency in the frequency domain where the PBCH is located, and the frequency in the frequency domain where the PBCH is located is greater than a frequency in the fourth frequency domain.

In some possible embodiments of the present disclosure, the control resource set includes the first CCE, the second CCE, the third CCE, and the fourth CCE. When detecting the control information on the at least one RB occupied by the control resource set in accordance with the predetermined mapping mode, the transceiver is further configured to detect the control information transmitted through the RBs occupied by the first CCE, the second CCE, the third CCE and the fourth CCE in the control resource set in accordance with the predetermined mapping mode.

In some possible embodiments of the present disclosure, the at least one RB adjacent to the RB occupied by the SS block further includes: number M1 of adjacent RBs at a same time domain as the first CCE, number M2 of adjacent RBs at a same time domain as the second CCE, number M3 of adjacent RBs at a same time domain as a first OFDM symbol of the third CCE, number M4 of adjacent RBs at a same time domain as a first OFDM symbol of the fourth CCE, number M5 of adjacent RBs at a same time domain as a second OFDM symbol of the third CCE, number M6 of adjacent RBs at a same time domain as a second OFDM symbol of the fourth CCE, number M7 of adjacent RBs at a same time domain as a third OFDM symbol of the third CCE, and number M8 of adjacent RBs at a same time domain as a third OFDM symbol of the fourth CCE. The M1, M3, M5 and M7 RBs are located at a same fifth frequency domain, the numbers of M2, M4, M6 and M8 of RBs are located at a same sixth frequency domain, a frequency in the fifth frequency domain is greater than the frequency in each of the first frequency domain and the third frequency domain, and a frequency in the sixth frequency domain is smaller than the frequency in each of the second frequency domain and the fourth frequency domain.

In some possible embodiments of the present disclosure, the number of M1 and M3 of RBs form a fifth CCE, the number of M2 and M4 of RBs form a sixth CCE, the number of M5 and M7 of RBs form a seventh CCE, and the number of M6 and M8 of RBs form an eighth CCE.

In some possible embodiments of the present disclosure, the control resource set includes the first CCE, the second CCE, the third CCE, the fourth CCE, the fifth CCE, the sixth CCE, the seventh CCE and the eighth CCE. When detecting the control information on the at least one RB occupied by the control resource set in accordance with the predetermined mapping mode, the transceiver is further configured to: detect the control information transmitted through the RBs occupied by the first CCE, the second CCE, the third CCE and the fourth CCE in the control resource set in accordance with the predetermined mapping mode; and/or detect the control information transmitted through the RBs occupied by the first CCE, the second CCE, the third CCE, the fourth CCE, the fifth CCE, the sixth CCE, the seventh CCE and the eighth CCE in the control resource set in accordance with the predetermined mapping mode.

In some possible embodiments of the present disclosure, the transceiver is further configured to receive a multiplexing mode of the control resource set and the SS block from the network device, and the multiplexing mode includes time-division multiplexing or frequency-division multiplexing.

In still yet another aspect, the present disclosure provides in some embodiments a communication device, including a processor, and a memory storing therein a computer program. The processor is configured to execute the computer program so as to implement the above-mentioned methods.

In still yet another aspect, the present disclosure provides in some embodiments a computer-readable storage medium storing therein an instruction. The instruction is executed by a computer so as to implement the above-mentioned methods.

The present disclosure at least has the following beneficial effects. According to the embodiments of the present disclosure, the control resource set for transmitting the control information may be mapped to the at least one RB adjacent to the RB occupied by the SS block in accordance with the predetermined mapping mode, and then the predetermined mapping mode may be transmitted to the UE and the control information may be transmitted to the UE on the at least one RB occupied by the control resource set. Through mapping the control resource set to a plurality of symbols at the frequency domain adjacent to the SS block, it is able to reduce the quantity of time-frequency resources for the beam scanning operation, thereby to improve the user scheduling flexibility. In addition, it is merely necessary to detect the physical resources occupied by the control resource set, rather than the entire system bandwidth or the sub-band bandwidth, so it is able to simplify the detection complexity of the UE.

DETAILED DESCRIPTION

The present disclosure will be described hereinafter in conjunction with the drawings and embodiments. The following embodiments are for illustrative purposes only, but shall not be used to limit the scope of the present disclosure. Actually, the embodiments are provided so as to facilitate the understanding of the scope of the present disclosure.

Figure 3:
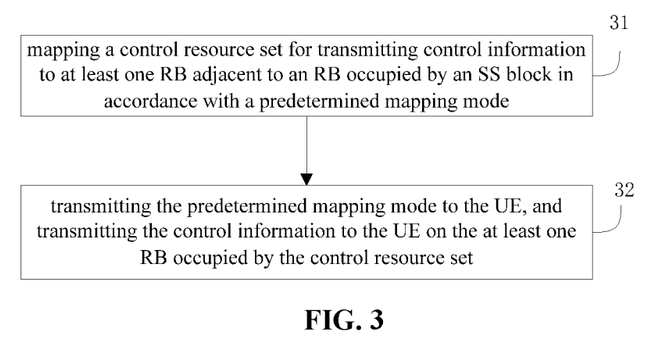
FIG. 3 is a flow chart of a control information transmission method according to one embodiment of the present disclosure.

As shown in FIG. 3, the present disclosure provides in some embodiments a control information transmission method which includes the following steps.

Step 31: mapping a control resource set for transmitting control information to at least one RB adjacent to an RB occupied by an SS block in accordance with a predetermined mapping mode. Here, the control resource set may be used for an initial access process of a user or transmit public information (including one of scheduling system information, paging information, power control information or any other public broadcast information). The control resource set may also be called as public control resource set. The term "public control resource set" defined herein is merely used for description, but shall not be used to limit functions of the control resource set.

Step 32: transmitting the predetermined mapping mode to the UE, and transmitting the control information to the UE on the at least one RB occupied by the control resource set.

In the embodiments of the present disclosure, Step 31 may include mapping the control resource set for transmitting the control information to at least one RB adjacent to an RB occupied by a PSS in the SS block and to at least one RB adjacent to an RB occupied by a PBCH in the SS block in accordance with the predetermined mapping mode.

To be specific, the at least one RB adjacent to the RB occupied by the PSS may include at least one RB at a same time domain as, and at a different frequency domain from, the RB occupied by the PSS. For example, the at least one RB at the same time domain as, and at the different frequency domain from, the RB occupied by the PSS may include a first CCE consisting of N consecutive RBs at the same time domain as the RB occupied by the PSS and at a first frequency domain, and a second CCE consisting of N consecutive RBs at the same time domain as the RB occupied by the PSS and at a second frequency domain.

The at least one RB adjacent to the RB occupied by the PBCH may include at least one RB at a same time domain as, and at a different frequency domain from, the RB occupied by the PBCH. For example, the at least one RB at the same time domain as, and at the different frequency domain from, the RB occupied by the PBCH may include a third CCE consisting of N consecutive RBs at the same time domain as the RB occupied by the PBCH and at a third frequency domain, and a fourth CCE consisting of N consecutive RBs at the same time domain as the RB occupied by the PBCH and at a fourth frequency domain. Here, N=6. Of course, N may be of any other value. In addition, the description herein merely relates to a size relationship between the frequency in the first frequency domain and the frequency in the second frequency domain, rather than positions of the first frequency domain and the second frequency domain in a mapping pattern.

The PSS and the PBCH may be located at a same central frequency point and at different time domains, and occupy different bandwidths. The PSS may occupy one OFDM symbol in the time domain, and the PBCH may occupy three OFDM symbols in the time domain. A frequency in the first frequency domain may be greater than a frequency in the frequency domain where the PSS is located, and the frequency in the frequency domain where the PSS is located may be greater than a frequency in the second frequency domain. A frequency in the third frequency domain may be greater than a frequency in the frequency domain where the PBCH is located, and the frequency in the frequency domain where the PBCH is located may be greater than a frequency in the fourth frequency domain.

A specific design pattern of the control resource set will be described hereinafter in conjunction with the drawings.

Figure 4:
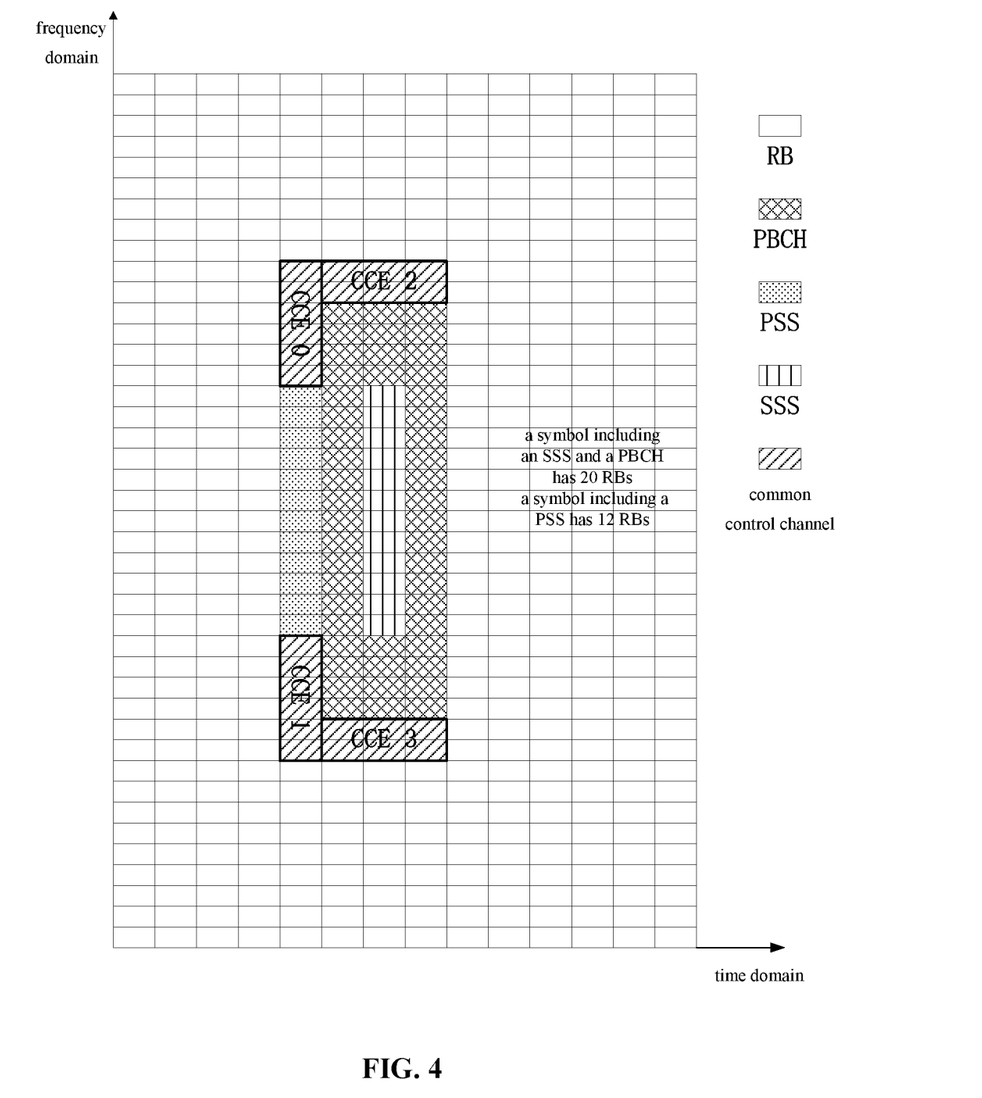
FIG. 4 is a schematic view showing a mapping mode 1 of a control resource set according to one embodiment of the present disclosure.

As shown in FIG. 4, in a 5$^{th}$-Generation (5G) New Radio (NR) system, the public control resource set may include 24 RBs for the transmission of a common control channel (6 RBs in each of the four CCEs as specified in the 5G system), i.e., 6 RBs at either side of the PSS and 6 RBs at either side of the PBCH (the 6 RBs adjacent to the PSS may occupy one OFDM symbol in the time domain and occupy 6 RBs in the frequency domain, and the 6 RBs adjacent to the PBCH may occupy three OFDM symbols in the time domain and occupy 2 RBs in the frequency domain). In this pattern, each RB may be, for example, a Physical Resource Block (PRB).

The 24 RBs may be divided into CCE0 (i.e., the first CCE), CCE1 (i.e., the second CCE), CCE2 (i.e., the third CCE), and CCE3 (i.e., the fourth CCE). The serial numbers CCE0 to CCE3 are merely used for illustratively purposes, but shall not be used to limit the scope of the present disclosure. In addition, any other serial numbers may also be applied.

In this pattern, when a subcarrier spacing is 15 kHz, each RB may include 12 subcarriers and have a bandwidth of 180 kHz, and the PBCH in the SS block (a Secondary Synchronization Signal (SSS) may occupy 12 RBs in the middle of a central symbol) may occupy 20 RBs in the frequency domain and have a bandwidth of 3.6 MHz. When the subcarrier spacing is 30 kHz, the PBCH may have a bandwidth of 7.2 MHz. In addition, when the subcarrier spacing is of any other value, the bandwidth occupied by the SS block may be extended correspondingly.

In the embodiments of the present disclosure, the control resource set may include the first CCE, the second CCE, the third CCE, and the fourth CCE. During the transmission of the control information, Step 32 may include transmitting the control information on the RBs occupied by the first CCE, the second CCE, the third CCE and the fourth CCE in the control resource set.

In another possible embodiment of the present disclosure, Step 31 may include mapping the control resource set for transmitting the control information to at least one RB adjacent to the RB occupied by the PSS in the SS block and to at least one RB adjacent to the RB occupied by the PBCH in the SS block in accordance with the predetermined mapping mode.

To be specific, the at least one RB adjacent to the RB occupied by the PSS may include at least one RB at a same time domain as, and at a different frequency domain from, the RB occupied by the PSS. For example, the at least one RB at the same time domain as, and at the different frequency domain from, the RB occupied by the PSS may include the first CCE consisting of N consecutive RBs at the same time domain as the RB occupied by the PSS and at the first frequency domain, and the second CCE consisting of N consecutive RBs at the same time domain as the RB occupied by the PSS and at the second frequency domain.

The at least one RB adjacent to the RB occupied by the PBCH may include at least one RB at a same time domain as, and at a different frequency domain from, the RB occupied by the PBCH. For example, the at least one RB at the same time domain as, and at the different frequency domain from, the RB occupied by the PBCH may include the third CCE consisting of N consecutive RBs at the same time domain as the RB occupied by the PBCH and at the third frequency domain, and the fourth CCE consisting of N consecutive RBs at the same time domain as the RB occupied by the PBCH and at the fourth frequency domain.

In addition, Step 31 may include mapping the control resource set for transmitting the control information to, in accordance with the predetermined mapping mode, number M1 of adjacent RBs at a same time domain as the first CCE, number M2 of adjacent RBs at a same time domain as the second CCE, number M3 of adjacent RBs at a same time domain as a first OFDM symbol of the third CCE, number M4 of adjacent RBs at a same time domain as a first OFDM symbol of the fourth CCE, number M5 of adjacent RBs at a same time domain as a second OFDM symbol of the third CCE, number M6 of adjacent RBs at a same time domain as a second OFDM symbol of the fourth CCE, number M7 of adjacent RBs at a same time domain as a third OFDM symbol of the third CCE, and number M8 of adjacent RBs at a same time domain as a third OFDM symbol of the fourth CCE. The M1, M3, M5 and M7 RBs may be located at a same frequency domain, i.e., a fifth frequency domain, the numbers of M2, M4, M6 and M8 of RBs may be located at a same frequency domain, i.e., a sixth frequency domain, a frequency in the fifth frequency domain may be greater than the frequency in each of the first frequency domain and the third frequency domain, and a frequency in the sixth frequency domain may be smaller than the frequency in each of the second frequency domain and the fourth frequency domain.

Here, the description merely relates to a size relationship among the frequencies in the first frequency domain, the second frequency domain, the third frequency domain and the fourth frequency domain, rather than positions of the first frequency domain, the second frequency domain, the third frequency domain and the fourth frequency domain in a mapping pattern.

In some possible embodiments of the present disclosure, the number of M1 and M3 of RBs may form a fifth CCE, the number of M2 and M4 of RBs may form a sixth CCE, the number of M5 and M7 of RBs may form a seventh CCE, and the number of M6 and M8 of RBs form may an eighth CCE. N=6, and M1=M2=M3=M4=M5=M6=M7=M8=3.

Another design pattern of the control resource set will be described hereinafter in conjunction with the drawings.

Figure 5:
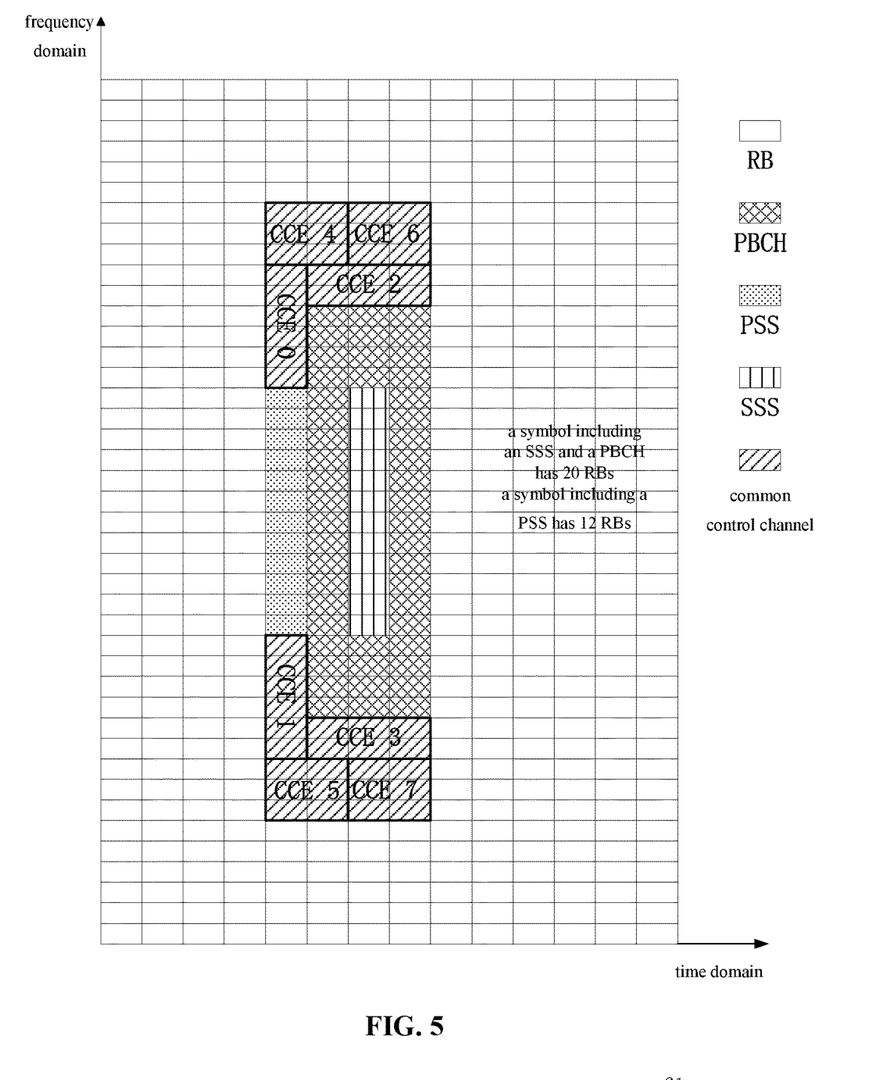
FIG. 5 is a schematic view showing a mapping mode 2 of the control resource set according to one embodiment of the present disclosure.

As shown in FIG. 5, in the 5G NR system, the public control resource set may include totally 48 RBs (6 RBs in each of the eight CCEs as specified in the 5G system), i.e., 6 RBs at either side of the PSS, 6 RBs at either side of the PBCH (the 6 RBs adjacent to the PSS may occupy one OFDM symbol in the time domain and occupy 6 RBs in the frequency domain, and the 6 RBs adjacent to the PBCH may occupy three OFDM symbols in the time domain and occupy 2 RBs in the frequency domain), 12 RBs adjacent to the first CCE and the third CCE, and 12 RBs adjacent to the second CCE and the fourth CCE. In this pattern, each RB may be, for example, a PRB.

The 24 RBs adjacent to the PSS and the PBCH may be divided into CCE0, CCE1, CCE2 and CCE3, and the 24 RBs adjacent to the first CCE, the second CCE, the third CCE and the fourth CCE may be divided into CCE4 (i.e., the fifth CCE), CCE5 (i.e., the sixth CCE), CCE6 (i.e., the seventh CCE), and CCE7 (i.e., the eighth CCE).

It should be appreciated that, the serial numbers CCE0 to CCE3 and CCE4 to CCE7 are merely used for illustratively purposes, but shall not be used to limit the scope of the present disclosure. In addition, any other serial numbers may also be applied.

In addition, in this pattern, when a subcarrier spacing is 15 kHz, each RB may include 12 subcarriers and have a bandwidth of 180 kHz, and the PBCH in the SS block (the SSS may occupy 12 RBs in the middle of a central symbol) may occupy 20 RBs in the frequency domain and have a bandwidth of 3.6 MHz. When the subcarrier spacing is 30 kHz, the PBCH may have a bandwidth of 7.2 MHz. In addition, when the subcarrier spacing is of any other value, the bandwidth occupied by the SS block may be extended correspondingly.

In the embodiments of the present disclosure, the control resource set may include the first CCE, the second CCE, the third CCE, the fourth CCE, the fifth CCE, the sixth CCE, the seventh CCE and the eighth CCE. During the transmission of the control information, Step 32 may include: transmitting the control information on the RBs occupied by the first CCE, the second CCE, the third CCE and the fourth CCE in the control resource set; and/or transmitting the control information on the RBs occupied by the first CCE, the second CCE, the third CCE, the fourth CCE, the fifth CCE, the sixth CCE, the seventh CCE and the eighth CCE in the control resource set.

In some possible embodiments of the present disclosure, on the basis of Steps 31 and 32, the control information transmission method may further include Step 33 of transmitting a multiplexing mode of the control resource set and the SS block to the UE, and the multiplexing mode may include time-division multiplexing or frequency-division multiplexing.

To be specific, the multiplexing mode of the control resource set and the SS block may be transmitted to the UE through semi-static indication. The semi-static indication may include indicating the PBCH through one bit, or Radio Resource Control (RRC) signaling configuration.

According to the embodiments of the present disclosure, the control resource set for transmitting the control information may be mapped to the at least one RB adjacent to the RB occupied by the SS block in accordance with the predetermined mapping mode, and then the predetermined mapping mode may be transmitted to the UE and the control information may be transmitted to the UE on the at least one RB occupied by the control resource set. Through mapping the control resource set to a plurality of symbols at the frequency domain adjacent to the SS block, it is able to reduce the quantity of time-frequency resources for the beam scanning operation. In addition, it is merely necessary to detect the physical resources occupied by the control resource set, rather than the entire system bandwidth or the sub-band bandwidth, so it is able to simplify the detection complexity of the UE.

In addition, the multiplexing mode of the control resource set may be transmitted to the UE, and the multiplexing mode may include the time-division multiplexing or the frequency-division multiplexing. In this way, it is able to improve the user scheduling flexibility.

Figure 6:
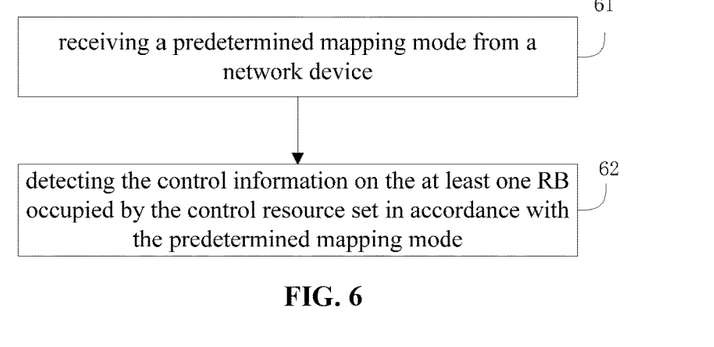
FIG. 6 is a flow chart of a control information detection method according to one embodiment of the present disclosure.

As shown in FIG. 6, the present disclosure further provides in some embodiments a control information detection method which includes: Step 61 of receiving a predetermined mapping mode from a network device, the predetermined mapping mode being a mapping mode in which a control resource set for transmitting control information is mapped by the network device to at least one RB adjacent to an RB occupied by an SS block; and Step 62 of detecting the control information on the at least one RB occupied by the control resource set in accordance with the predetermined mapping mode.

In some possible embodiments of the present disclosure, the at least one RB adjacent to the RB occupied by the SS block may include at least one RB adjacent to an RB occupied by a PSS in the SS block and at least one RB adjacent to an RB occupied by a PBCH in the SS block.

In some possible embodiments of the present disclosure, the at least one RB adjacent to the RB occupied by the PSS may include at least one RB at a same time domain as, and at a different frequency domain from, the RB occupied by the PSS, and the at least one RB adjacent to the RB occupied by the PBCH may include at least one RB at a same time domain as, and at a different frequency domain from, the RB occupied by the PBCH.

In some possible embodiments of the present disclosure, the at least one RB at the same time domain as, and at the different frequency domain from, the RB occupied by the PSS may include a first Control Channel Element (CCE) consisting of N consecutive RBs at the same time domain as the RB occupied by the PSS and at a first frequency domain, and a second CCE consisting of N consecutive RBs at the same time domain as the RB occupied by the PSS and at a second frequency domain. The at least one RB at the same time domain as, and at the different frequency domain from, the RB occupied by the PBCH may include a third CCE consisting of N consecutive RBs at the same time domain as the RB occupied by the PBCH and at a third frequency domain, and a fourth CCE consisting of N consecutive RBs at the same time domain as the RB occupied by the PBCH and at a fourth frequency domain.

In some possible embodiments of the present disclosure, the PSS and the PBCH may be located at a same central frequency point and at different time domains, and occupy different bandwidths. The PSS may occupy one OFDM symbol in the time domain, and the PBCH may occupy three OFDM symbols in the time domain. A frequency in the first frequency domain may be greater than a frequency in the frequency domain where the PSS is located, and the frequency in the frequency domain where the PSS is located may be greater than a frequency in the second frequency domain. A frequency in the third frequency domain may be greater than a frequency in the frequency domain where the PBCH is located, and the frequency in the frequency domain where the PBCH is located may be greater than a frequency in the fourth frequency domain.

In some possible embodiments of the present disclosure, $N=6$.

In some possible embodiments of the present disclosure, the control resource set may include the first CCE, the second CCE, the third CCE, and the fourth CCE. The detecting the control information on the at least one RB occupied by the control resource set in accordance with the predetermined mapping mode may include detecting the control information transmitted through the RBs occupied by the first CCE, the second CCE, the third CCE and the fourth CCE in the control resource set in accordance with the predetermined mapping mode.

In some possible embodiments of the present disclosure, referring to the mapping mode in FIG. 4, during the detection of the control information, the UE may detect the control resource set corresponding to CCE0 to CCE3, i.e., directly detect the 24 RBs corresponding to the control resource set.

In another possible embodiment of the present disclosure, the at least one RB adjacent to the RB occupied by the SS block may include at least one RB adjacent to an RB occupied by a PSS in the SS block and at least one RB adjacent to an RB occupied by a PBCH in the SS block.

In some possible embodiments of the present disclosure, the at least one RB adjacent to the RB occupied by the PSS may include at least one RB at a same time domain as, and at a different frequency domain from, the RB occupied by the PSS, and the at least one RB adjacent to the RB occupied by the PBCH may include at least one RB at a same time domain as, and at a different frequency domain from, the RB occupied by the PBCH.

In some possible embodiments of the present disclosure, the at least one RB at the same time domain as, and at the different frequency domain from, the RB occupied by the PSS may include a first CCE consisting of N consecutive RBs at the same time domain as the RB occupied by the PSS and at a first frequency domain, and a second CCE consisting of N consecutive RBs at the same time domain as the RB occupied by the PSS and at a second frequency domain. The at least one RB at the same time domain as, and at the different frequency domain from, the RB occupied by the PBCH may include a third CCE consisting of N consecutive RBs at the same time domain as the RB occupied by the PBCH and at a third frequency domain, and a fourth CCE consisting of N consecutive RBs at the same time domain as the RB occupied by the PBCH and at a fourth frequency domain.

In some possible embodiments of the present disclosure, the PSS and the PBCH may be located at a same central frequency point and at different time domains, and occupy different bandwidths. The PSS may occupy one OFDM symbol in the time domain, and the PBCH may occupy three OFDM symbols in the time domain. A frequency in the first frequency domain may be greater than a frequency in the frequency domain where the PSS is located, and the frequency in the frequency domain where the PSS is located may be greater than a frequency in the second frequency domain. A frequency in the third frequency domain may be greater than a frequency in the frequency domain where the PBCH is located, and the frequency in the frequency domain where the PBCH is located may be greater than a frequency in the fourth frequency domain.

In some possible embodiments of the present disclosure, the at least one RB adjacent to the RB occupied by the PBCH in the SS block may further include: number M1 of adjacent RBs at a same time domain as the first CCE, number M2 of adjacent RBs at a same time domain as the second CCE, number M3 of adjacent RBs at a same time domain as a first OFDM symbol of the third CCE, number M4 of adjacent RBs at a same time domain as a first OFDM symbol of the fourth CCE, number M5 of adjacent RBs at a same time domain as a second OFDM symbol of the third CCE, number M6 of adjacent RBs at a same time domain as a second OFDM symbol of the fourth CCE, number M7 of adjacent RBs at a same time domain as a third OFDM symbol of the third CCE, and number M8 of adjacent RBs at a same time domain as a third OFDM symbol of the fourth CCE. The M1, M3, M5 and M7 RBs may be located at a same frequency domain, i.e., a fifth frequency domain, the numbers of M2, M4, M6 and M8 of RBs may be located at a same frequency domain, i.e., a sixth frequency domain, a frequency in the fifth frequency domain may be greater than the frequency in each of the first frequency domain and the third frequency domain, and a frequency in the sixth frequency domain may be smaller than the frequency in each of the second frequency domain and the fourth frequency domain.

In some possible embodiments of the present disclosure, the number of M1 and M3 of RBs may form a fifth CCE, the number of M2 and M4 of RBs may form a sixth CCE, the number of M5 and M7 of RBs may form a seventh CCE, and the number of M6 and M8 of RBs may form an eighth CCE.

In some possible embodiments of the present disclosure, M1=M2=M3=M4=M5=M6=M7=M8=3.

In some possible embodiments of the present disclosure, the control resource set may include the first CCE, the second CCE, the third CCE, the fourth CCE, the fifth CCE, the sixth CCE, the seventh CCE and the eighth CCE. The detecting the control information on the at least one RB occupied by the control resource set in accordance with the predetermined mapping mode may include: detecting the control information transmitted through the RBs occupied by the first CCE, the second CCE, the third CCE and the fourth CCE in the control resource set in accordance with the predetermined mapping mode; and/or detecting the control information transmitted through the RBs occupied by the first CCE, the second CCE, the third CCE, the fourth CCE, the fifth CCE, the sixth CCE, the seventh CCE and the eighth CCE in the control resource set in accordance with the predetermined mapping mode.

To be specific, the UE may detect the 24 RBs corresponding to CCE0 to CCE3, detect the 24 RBs corresponding to CCE0 to CCE7, and perform blind detection on CCE0 to CCE3 and CCE0 to CCE7 sequentially.

In some possible embodiments of the present disclosure, the control information detection method may further include Step 63 of receiving a multiplexing mode of the control resource set and the SS block from the network device, and the multiplexing mode may include time-division multiplexing or frequency-division multiplexing.

In some possible embodiments of the present disclosure, the receiving the multiplexing mode of the control resource set and the SS block from the network device may include receiving the multiplexing mode of the control resource set and the SS block from the network device through semi-static indication.

According to the embodiments of the present disclosure, the control resource set for transmitting the control information may be mapped to the at least one RB adjacent to the RB occupied by the SS block in accordance with the predetermined mapping mode, and then the predetermined mapping mode may be transmitted to the UE and the control information may be transmitted to the UE on the at least one RB occupied by the control resource set. Through mapping the control resource set to a plurality of symbols at the frequency domain adjacent to the SS block, it is able to reduce the quantity of time-frequency resources for the beam scanning operation. In addition, it is merely necessary to detect the physical resources occupied by the control resource set, rather than the entire system bandwidth or the sub-band bandwidth, so it is able to simplify the detection complexity of the UE.

In addition, the multiplexing mode of the control resource set may be transmitted to the UE, and the multiplexing mode may include the time-division multiplexing or the frequency-division multiplexing. In this way, it is able to improve the user scheduling flexibility.

The present disclosure further provides in some embodiments a network device, which includes: a processor configured to map a control resource set for transmitting control information to at least one RB adjacent to an RB occupied by an SS block in accordance with a predetermined mapping mode; and a transceiver configured to transmit the predetermined mapping mode to the UE, and transmit the control information to the UE on the at least one RB occupied by the control resource set.

In some possible embodiments of the present disclosure, the processor is further configured to map the control resource set for transmitting the control information to at least one RB adjacent to an RB occupied by a PSS in the SS block and to at least one RB adjacent to an RB occupied by a PBCH in the SS block in accordance with the predetermined mapping mode.

In some possible embodiments of the present disclosure, the at least one RB adjacent to the RB occupied by the PSS may include at least one RB at a same time domain as, and at a different frequency domain from, the RB occupied by the PSS, and the at least one RB adjacent to the RB occupied by the PBCH may include at least one RB at a same time domain as, and at a different frequency domain from, the RB occupied by the PBCH.

In some possible embodiments of the present disclosure, the at least one RB at the same time domain as, and at the different frequency domain from, the RB occupied by the PSS may include a first CCE consisting of N consecutive RBs at the same time domain as the RB occupied by the PSS and at a first frequency domain, and a second CCE consisting of N consecutive RBs at the same time domain as the RB occupied by the PSS and at a second frequency domain. The at least one RB at the same time domain as, and at the different frequency domain from, the RB occupied by the PBCH may include a third CCE consisting of N consecutive RBs at the same time domain as the RB occupied by the PBCH and at a third frequency domain, and a fourth CCE consisting of N consecutive RBs at the same time domain as the RB occupied by the PBCH and at a fourth frequency domain.

In some possible embodiments of the present disclosure, the PSS and the PBCH may be located at a same central frequency point and at different time domains, and occupy different bandwidths. The PSS may occupy one OFDM symbol in the time domain, and the PBCH may occupy three OFDM symbols in the time domain. A frequency in the first frequency domain may be greater than a frequency in the frequency domain where the PSS is located, and the frequency in the frequency domain where the PSS is located may be greater than a frequency in the second frequency domain. A frequency in the third frequency domain may be greater than a frequency in the frequency domain where the PBCH is located, and the frequency in the frequency domain where the PBCH is located may be greater than a frequency in the fourth frequency domain.

In some possible embodiments of the present disclosure, the control resource set may include the first CCE, the second CCE, the third CCE, and the fourth CCE. The transceiver is further configured to transmit the control information on the RBs occupied by the first CCE, the second CCE, the third CCE and the fourth CCE in the control resource set.

In some possible embodiments of the present disclosure, the processor is further configured to map the control resource set for transmitting the control information to, in accordance with the predetermined mapping mode, number M1 of adjacent RBs at a same time domain as the first CCE, number M2 of adjacent RBs at a same time domain as the second CCE, number M3 of adjacent RBs at a same time domain as a first OFDM symbol of the third CCE, number M4 of adjacent RBs at a same time domain as a first OFDM symbol of the fourth CCE, number M5 of adjacent RBs at a same time domain as a second OFDM symbol of the third CCE, number M6 of adjacent RBs at a same time domain as a second OFDM symbol of the fourth CCE, number M7 of adjacent RBs at a same time domain as a third OFDM symbol of the third CCE, and number M8 of adjacent RBs at a same time domain as a third OFDM symbol of the fourth CCE. The M1, M3, M5 and M7 RBs may be located at a same frequency domain, i.e., a fifth frequency domain, the numbers of M2, M4, M6 and M8 of RBs may be located at a same frequency domain, i.e., a sixth frequency domain, a frequency in the fifth frequency domain may be greater than the frequency in each of the first frequency domain and the third frequency domain, and a frequency in the sixth frequency domain may be smaller than the frequency in each of the second frequency domain and the fourth frequency domain.

In some possible embodiments of the present disclosure, the number of M1 and M3 of RBs may form a fifth CCE, the number of M2 and M4 of RBs may form a sixth CCE, the number of M5 and M7 of RBs may form a seventh CCE, and the number of M6 and M8 of RBs may form an eighth CCE.

In some possible embodiments of the present disclosure, the control resource set may include the first CCE, the second CCE, the third CCE, the fourth CCE, the fifth CCE, the sixth CCE, the seventh CCE and the eighth CCE. The transceiver is further configured to: transmit the control information on the RBs occupied by the first CCE, the second CCE, the third CCE and the fourth CCE in the control resource set; and/or transmit the control information on the RBs occupied by the first CCE, the second CCE, the third CCE, the fourth CCE, the fifth CCE, the sixth CCE, the seventh CCE and the eighth CCE in the control resource set.

In some possible embodiments of the present disclosure, the transceiver is further configured to transmit a multiplexing mode of the control resource set and the SS block to the UE, and the multiplexing mode may include time-division multiplexing or frequency-division multiplexing.

It should be appreciated that, the network side device may be a base station, and the implementation of the network device may refer to that of the method in FIG. 3 with a same technical effect.

The present disclosure further provides in some embodiments a UE, which includes a transceiver configured to: receive a predetermined mapping mode from a network device, the predetermined mapping mode being a mapping mode in which a control resource set for transmitting control information is mapped by the network device to at least one RB adjacent to an RB occupied by an SS block; and detect the control information on the at least one RB occupied by the control resource set in accordance with the predetermined mapping mode.

In some possible embodiments of the present disclosure, the at least one RB adjacent to the RB occupied by the SS block may include at least one RB adjacent to an RB occupied by a PSS in the SS block and at least one RB adjacent to an RB occupied by a PBCH in the SS block.

In some possible embodiments of the present disclosure, the at least one RB adjacent to the RB occupied by the PSS may include at least one RB at a same time domain as, and at a different frequency domain from, the RB occupied by the PSS, and the at least one RB adjacent to the RB occupied by the PBCH may include at least one RB at a same time domain as, and at a different frequency domain from, the RB occupied by the PBCH.

In some possible embodiments of the present disclosure, the at least one RB at the same time domain as, and at the different frequency domain from, the RB occupied by the PSS may include a first CCE consisting of N consecutive RBs at the same time domain as the RB occupied by the PSS and at a first frequency domain, and a second CCE consisting of N consecutive RBs at the same time domain as the RB occupied by the PSS and at a second frequency domain. The at least one RB at the same time domain as, and at the different frequency domain from, the RB occupied by the PBCH may include a third CCE consisting of N consecutive RBs at the same time domain as the RB occupied by the PBCH and at a third frequency domain, and a fourth CCE consisting of N consecutive RBs at the same time domain as the RB occupied by the PBCH and at a fourth frequency domain.

In some possible embodiments of the present disclosure, the PSS and the PBCH may be located at a same central frequency point and at different time domains, and occupy different bandwidths. The PSS may occupy one OFDM symbol in the time domain, and the PBCH may occupy three OFDM symbols in the time domain. A frequency in the first frequency domain may be greater than a frequency in the frequency domain where the PSS is located, and the frequency in the frequency domain where the PSS is located may be greater than a frequency in the second frequency domain. A frequency in the third frequency domain may be greater than a frequency in the frequency domain where the PBCH is located, and the frequency in the frequency domain where the PBCH is located may be greater than a frequency in the fourth frequency domain.

In some possible embodiments of the present disclosure, the control resource set may include the first CCE, the second CCE, the third CCE, and the fourth CCE. When detecting the control information on the at least one RB occupied by the control resource set in accordance with the predetermined mapping mode, the transceiver is further configured to detect the control information transmitted through the RBs occupied by the first CCE, the second CCE, the third CCE and the fourth CCE in the control resource set in accordance with the predetermined mapping mode.

In some possible embodiments of the present disclosure, the at least one RB adjacent to the RB occupied by the SS block may further include: number M1 of adjacent RBs at a same time domain as the first CCE, number M2 of adjacent RBs at a same time domain as the second CCE, number M3 of adjacent RBs at a same time domain as a first OFDM symbol of the third CCE, number M4 of adjacent RBs at a same time domain as a first OFDM symbol of the fourth CCE, number M5 of adjacent RBs at a same time domain as a second OFDM symbol of the third CCE, number M6 of adjacent RBs at a same time domain as a second OFDM symbol of the fourth CCE, number M7 of adjacent RBs at a same time domain as a third OFDM symbol of the third CCE, and number M8 of adjacent RBs at a same time domain as a third OFDM symbol of the fourth CCE. The M1, M3, M5 and M7 RBs may be located at a same frequency domain, i.e., a fifth frequency domain, the numbers of M2, M4, M6 and M8 of RBs may be located at a same frequency domain, i.e., a sixth frequency domain, a frequency in the fifth frequency domain may be greater than the frequency in each of the first frequency domain and the third frequency domain, and a frequency in the sixth frequency domain may be smaller than the frequency in each of the second frequency domain and the fourth frequency domain.

In some possible embodiments of the present disclosure, the number of M1 and M3 of RBs may form a fifth CCE, the number of M2 and M4 of RBs may form a sixth CCE, the number of M5 and M7 of RBs may form a seventh CCE, and the number of M6 and M8 of RBs may form an eighth CCE.

In some possible embodiments of the present disclosure, the control resource set may include the first CCE, the second CCE, the third CCE, the fourth CCE, the fifth CCE, the sixth CCE, the seventh CCE and the eighth CCE. When detecting the control information on the at least one RB occupied by the control resource set in accordance with the predetermined mapping mode, the transceiver is further configured to: detect the control information transmitted through the RBs occupied by the first CCE, the second CCE, the third CCE and the fourth CCE in the control resource set in accordance with the predetermined mapping mode; and/or detect the control information transmitted through the RBs occupied by the first CCE, the second CCE, the third CCE, the fourth CCE, the fifth CCE, the sixth CCE, the seventh CCE and the eighth CCE in the control resource set in accordance with the predetermined mapping mode.

In some possible embodiments of the present disclosure, the transceiver is further configured to receive a multiplexing mode of the control resource set and the SS block from the network device, and the multiplexing mode may include time-division multiplexing or frequency-division multiplexing.

It should be appreciated that, the implementation of the UE may refer to that of the method shown in FIG. 6 with a same technical effect.

The present disclosure further provides in some embodiments a communication device, including a processor, and a memory storing therein a computer program. The processor is configured to execute the computer program so as to implement the above-mentioned methods. The processor may communicate with the memory via a bus or an interface. The communication device may be the above-mentioned network device or the above-mentioned UE.

The present disclosure further provides in some embodiments a computer-readable storage medium storing therein an instruction. The instruction is executed by a computer so as to implement the above-mentioned methods.

According to the embodiments of the present disclosure, the control resource set for transmitting the control information may be mapped to the at least one RB adjacent to the RB occupied by the SS block in accordance with the predetermined mapping mode, and then the predetermined mapping mode may be transmitted to the UE and the control information may be transmitted to the UE on the at least one RB occupied by the control resource set. Through mapping the control resource set to a plurality of symbols at the frequency domain adjacent to the SS block, it is able to reduce the quantity of time-frequency resources for the beam scanning operation. In addition, it is merely necessary to detect the physical resources occupied by the control resource set, rather than the entire system bandwidth or the sub-band bandwidth, so it is able to simplify the detection complexity of the UE. Furthermore, the control resource set and the SS block may be multiplexed in a frequency-division manner, thereby to improve the user scheduling flexibility.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A control information transmission method, comprising:

mapping a control resource set for transmitting control information to at least one Resource Block (RB) adjacent to an RB occupied by a Synchronization Signal (SS) block in accordance with a predetermined mapping mode; and transmitting the predetermined mapping mode to a User Equipment (UE), and transmitting the control information to the UE on the at least one RB occupied by the control resource set,
wherein the mapping the control resource set for transmitting the control information to at least one RB adjacent to the RB occupied by the SS block in accordance with the predetermined mapping mode comprises: mapping the control resource set for transmitting the control information to at least one RB adjacent to an RB occupied by a Physical Broadcast Channel (PBCH) in the SS block in accordance with the predetermined mapping mode;
wherein the at least one RB adjacent to the RB occupied by the PBCH comprises at least one RB at a same time domain as, and at a different frequency domain from, the RB occupied by the PBCH.

2. The control information transmission method according to claim 1, wherein the mapping the control resource set for transmitting the control information to at least one RB adjacent to the RB occupied by the SS block in accordance with the predetermined mapping mode comprises:
mapping the control resource set for transmitting the control information to at least one RB adjacent to an RB occupied by a Primary Synchronization Signal (PSS) in the SS block.

3. The control information transmission method according to claim 2, wherein the at least one RB adjacent to the RB occupied by the PSS comprises at least one RB at a same time domain as, and at a different frequency domain from, the RB occupied by the PSS.

4. The control information transmission method according to claim 3, wherein the at least one RB at the same time domain as, and at the different frequency domain from, the RB occupied by the PSS comprises a first Control Channel Element (CCE) consisting of N consecutive RBs at the same time domain as the RB occupied by the PSS and at a first frequency domain, and a second CCE consisting of N consecutive RBs at the same time domain as the RB occupied by the PSS and at a second frequency domain,
wherein the at least one RB at the same time domain as, and at the different frequency domain from, the RB occupied by the PBCH comprises a third CCE consisting of N consecutive RBs at the same time domain as the RB occupied by the PBCH and at a third frequency domain, and a fourth CCE consisting of N consecutive RBs at the same time domain as the RB occupied by the PBCH and at a fourth frequency domain,
wherein the PSS and the PBCH are located at a same central frequency point and at different time domains, and occupy different bandwidths, the PSS occupies one Orthogonal Frequency Division Multiplexing (OFDM) symbol in the time domain, and the PBCH occupies three OFDM symbols in the time domain,
wherein a frequency in the first frequency domain is greater than a frequency in the frequency domain where the PSS is located, the frequency in the frequency domain where the PSS is located is greater than a frequency in the second frequency domain, a frequency in the third frequency domain is greater than a frequency in the frequency domain where the PBCH is located, and the frequency in the frequency domain where the PBCH is located is greater than a frequency in the fourth frequency domain,
wherein N=6.

5. The control information transmission method according to claim 4, wherein the control resource set comprises the first CCE, the second CCE, the third CCE, and the fourth CCE, wherein the transmitting the control information on the at least one RB occupied by the control resource set comprises transmitting the control information on the RBs occupied by the first CCE, the second CCE, the third CCE and the fourth CCE in the control resource set.

6. The control information transmission method according to claim 4, further comprising:
mapping the control resource set for transmitting the control information to, in accordance with the predetermined mapping mode, number M1 of adjacent RBs at a same time domain as the first CCE, number M2 of adjacent RBs at a same time domain as the second CCE, number M3 of adjacent RBs at a same time domain as a first OFDM symbol of the third CCE, number M4 of adjacent RBs at a same time domain as a first OFDM symbol of the fourth CCE, number M5 of adjacent RBs at a same time domain as a second OFDM symbol of the third CCE, number M6 of adjacent RBs at a same time domain as a second OFDM symbol of the fourth CCE, number M7 of adjacent RBs at a same time domain as a third OFDM symbol of the third CCE, and number M8 of adjacent RBs at a same time domain as a third OFDM symbol of the fourth CCE, wherein the numbers of M1, M3, M5 and M7 of RBs are located at a same fifth frequency domain, the numbers of M2, M4, M6 and M8 of RBs are located at a same sixth frequency domain, a frequency in the fifth frequency domain is greater than the frequency in each of the first frequency domain and the third frequency domain, and a frequency in the sixth frequency domain is smaller than the frequency in each of the second frequency domain and the fourth frequency domain.

7. The control information transmission method according to claim 6, wherein the number of M1 and M3 of RBs form a fifth CCE, the number of M2 and M4 of RBs form a sixth CCE, the number of M5 and M7 of RBs form a seventh CCE, and the number of M6 and M8 of RBs form an eighth CCE,
wherein M1=M2=M3=M4=M5=M6=M7=M8=3.

8. The control information transmission method according to claim 6,
wherein the control resource set comprises the first CCE, the second CCE, the third CCE, the fourth CCE, the fifth CCE, the sixth CCE, the seventh CCE and the eighth CCE,
wherein the transmitting the control information on the at least one RB occupied by the control resource set comprises:
transmitting the control information on the RBs occupied by the first CCE, the second CCE, the third CCE and the fourth CCE in the control resource set; and/or
transmitting the control information on the RBs occupied by the first CCE, the second CCE, the third CCE, the fourth CCE, the fifth CCE, the sixth CCE, the seventh CCE and the eighth CCE in the control resource set.

9. The control information transmission method according to claim 1, further comprising:
transmitting a multiplexing mode of the control resource set and the SS block to the UE, wherein the multiplexing mode comprises time-division multiplexing or frequency-division multiplexing; and
wherein the transmitting the multiplexing mode of the control resource set and the SS block to the UE comprises:

transmitting the multiplexing mode of the control resource set and the SS block to the UE through semi-static indication.

10. A control information detection method, comprising:
receiving a predetermined mapping mode from a network device, the predetermined mapping mode being a mapping mode in which a control resource set for transmitting control information is mapped by the network device to at least one Resource Block (RB) adjacent to an RB occupied by a Synchronization Signal (SS) block; and
detecting the control information on the at least one RB occupied by the control resource set in accordance with the predetermined mapping mode,
wherein the at least one RB adjacent to the RB occupied by the SS block comprises at least one RB adjacent to an RB occupied by a Physical Broadcast Channel (PBCH) in the SS block;
wherein the at least one RB adjacent to the RB occupied by the PBCH comprises at least one RB at a same time domain as, and at a different frequency domain from, the RB occupied by the PBCH.

11. The control information detection method according to claim 10, wherein the at least one RB adjacent to the RB occupied by the SS block comprises at least one RB adjacent to an RB occupied by a Primary Synchronization Signal (PSS) in the SS block.

12. The control information detection method according to claim 11, wherein the at least one RB adjacent to the RB occupied by the PSS comprises at least one RB at a same time domain as, and at a different frequency domain from, the RB occupied by the PSS.

13. The control information detection method according to claim 12, wherein the at least one RB at the same time domain as, and at the different frequency domain from, the RB occupied by the PSS comprises a first Control Channel Element (CCE) consisting of N consecutive RBs at the same time domain as the RB occupied by the PSS and at a first frequency domain, and a second CCE consisting of N consecutive RBs at the same time domain as the RB occupied by the PSS and at a second frequency domain,
wherein the at least one RB at the same time domain as, and at the different frequency domain from, the RB occupied by the PBCH comprises a third CCE consisting of N consecutive RBs at the same time domain as the RB occupied by the PBCH and at a third frequency domain, and a fourth CCE consisting of N consecutive RBs at the same time domain as the RB occupied by the PBCH and at a fourth frequency domain,
wherein the PSS and the PBCH are located at a same central frequency point and at different time domains, and occupy different bandwidths, the PSS occupies one Orthogonal Frequency Division Multiplexing (OFDM) symbol in the time domain, and the PBCH occupies three OFDM symbols in the time domain,
wherein a frequency in the first frequency domain is greater than a frequency in the frequency domain where the PSS is located, the frequency in the frequency domain where the PSS is located is greater than a frequency in the second frequency domain, a frequency in the third frequency domain is greater than a frequency in the frequency domain where the PBCH is located, and the frequency in the frequency domain where the PBCH is located is greater than a frequency in the fourth frequency domain,
wherein N=6.

14. The control information detection method according to claim 13, wherein the control resource set comprises the first CCE, the second CCE, the third CCE, and the fourth CCE, wherein the detecting the control information on the at least one RB occupied by the control resource set in accordance with the predetermined mapping mode comprises detecting the control information transmitted through the RBs occupied by the first CCE, the second CCE, the third CCE and the fourth CCE in the control resource set in accordance with the predetermined mapping mode.

15. The control information detection method according to claim 13, wherein the at least one RB adjacent to the RB occupied by the SS block further comprises: number M1 of adjacent RBs at a same time domain as the first CCE, number M2 of adjacent RBs at a same time domain as the second CCE, number M3 of adjacent RBs at a same time domain as a first OFDM symbol of the third CCE, number M4 of adjacent RBs at a same time domain as a first OFDM symbol of the fourth CCE, number M5 of adjacent RBs at a same time domain as a second OFDM symbol of the third CCE, number M6 of adjacent RBs at a same time domain as a second OFDM symbol of the fourth CCE, number M7 of adjacent RBs at a same time domain as a third OFDM symbol of the third CCE, and number M8 of adjacent RBs at a same time domain as a third OFDM symbol of the fourth CCE, wherein the numbers of M1, M3, M5 and M7 of RBs are located at a same fifth frequency domain, the numbers of M2, M4, M6 and M8 of RBs are located at a same sixth frequency domain, a frequency in the fifth frequency domain is greater than the frequency in each of the first frequency domain and the third frequency domain, and a frequency in the sixth frequency domain is smaller than the frequency in each of the second frequency domain and the fourth frequency domain.

16. The control information detection method according to claim 15, wherein the number of M1 and M3 of RBs form a fifth CCE, the number of M2 and M4 of RBs form a sixth CCE, the number of M5 and M7 of RBs form a seventh CCE, and the number of M6 and M8 of RBs form an eighth CCE,
wherein M1=M2=M3=M4=M5=M6=M7=M8=3.

17. The control information detection method according to claim 16, wherein the control resource set comprises the first CCE, the second CCE, the third CCE, the fourth CCE, the fifth CCE, the sixth CCE, the seventh CCE and the eighth CCE,
wherein the detecting the control information on the at least one RB occupied by the control resource set in accordance with the predetermined mapping mode comprises:
detecting the control information transmitted through the RBs occupied by the first CCE, the second CCE, the third CCE and the fourth CCE in the control resource set in accordance with the predetermined mapping mode; and/or
detecting the control information transmitted through the RBs occupied by the first CCE, the second CCE, the third CCE, the fourth CCE, the fifth CCE, the sixth CCE, the seventh CCE and the eighth CCE in the control resource set in accordance with the predetermined mapping mode.

18. The control information detection method according to claim 10, further comprising:
receiving a multiplexing mode of the control resource set and the SS block from the network device, wherein the multiplexing mode comprises time-division multiplexing or frequency-division multiplexing; and wherein the receiving the multiplexing mode of the control resource set and the SS block from the network device comprises:
receiving the multiplexing mode of the control resource set and the SS block from the network device through semi-static indication.

19. A User Equipment (UE), comprising a transceiver configured to realize the control information detection method according to claim 10.

20. A network device, comprising:
a processor configured to map a control resource set for transmitting control information to at least one RB adjacent to an RB occupied by an SS block in accordance with a predetermined mapping mode; and
a transceiver configured to transmit the predetermined mapping mode to the UE, and transmit the control information to the UE on the at least one RB occupied by the control resource set,
wherein the processor is further configured to map the control resource set for transmitting the control information to at least one RB adjacent to an RB occupied by a Physical Broadcast Channel (PBCH) in the SS block in accordance with the predetermined mapping mode;
wherein the at least one RB adjacent to the RB occupied by the PBCH comprises at least one RB at a same time domain as, and at a different frequency domain from, the RB occupied by the PBCH.

* * * * *